United States Patent [19]
Ito et al.

[11] Patent Number: 5,988,342
[45] Date of Patent: Nov. 23, 1999

[54] BRAKING DEVICE OF A LINEAR MOTOR TABLE

[75] Inventors: Osamu Ito; Takaaki Tsuboi, both of Kanagawa, Japan

[73] Assignee: Nippon Thompson Co., Ltd., Tokyo, Japan

[21] Appl. No.: 09/093,393

[22] Filed: Jun. 9, 1998

[30] Foreign Application Priority Data

Jun. 12, 1997 [JP] Japan ................................... 9-171080

[51] Int. Cl.$^6$ .................................................. F16D 63/00
[52] U.S. Cl. ............................................ 192/144; 188/67
[58] Field of Search ........................... 192/144; 188/171, 188/137, 67; 74/490.09

[56] References Cited

U.S. PATENT DOCUMENTS

| | | | |
|---|---|---|---|
| 4,030,579 | 6/1977 | Sell | 188/171 |
| 4,382,395 | 5/1983 | Haar | 83/71 |
| 4,515,251 | 5/1985 | Wruk | 188/171 |
| 4,681,506 | 7/1987 | Teramachi | 414/749 |
| 5,040,431 | 8/1991 | Sakino t al. | 74/490.09 |
| 5,069,326 | 12/1991 | Sakamoto et al. | 198/619 |
| 5,351,789 | 10/1994 | Tochihara et al. | 188/67 |
| 5,829,811 | 11/1998 | Skinner | 188/67 X |

*Primary Examiner*—Rodney H. Bonck
*Attorney, Agent, or Firm*—Browdy and Neimark

[57] ABSTRACT

The present invention provides a braking device of a linear motor table which can stop in a fixed state of the table when the electrical feed is cut off. A braking device 11 is installed, which comprises: a shaft 12 extending in the direction of movement and attached to the table 42; a retainer 14 movably inserted onto the shaft 12; balls 15 inserted into the pocket of the retainer 14 and rolling along the shaft 12; an outer cylinder 16 located including the retainer 14 and having a tapered surface 16a on the inside of the outer cylinder; a coil spring 18 for urging retainer 14 to be jammed onto the tapered surface 16a; and a linear electromagnetic solenoid 17 which urge the retainer 14 for making the balls 15 release the tapered surface 16a. When the electrical feed is cut off, the balls 15 are jammed on the tapered surface 16a by the action of a wedge, and the table is stopped.

9 Claims, 7 Drawing Sheets

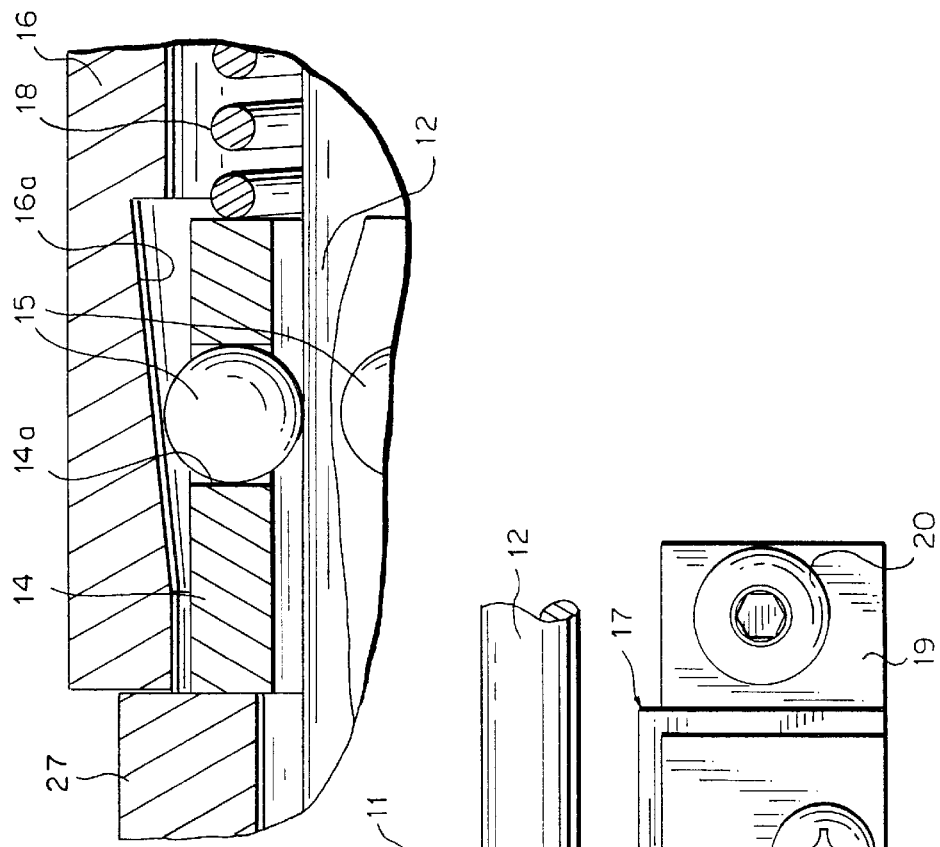
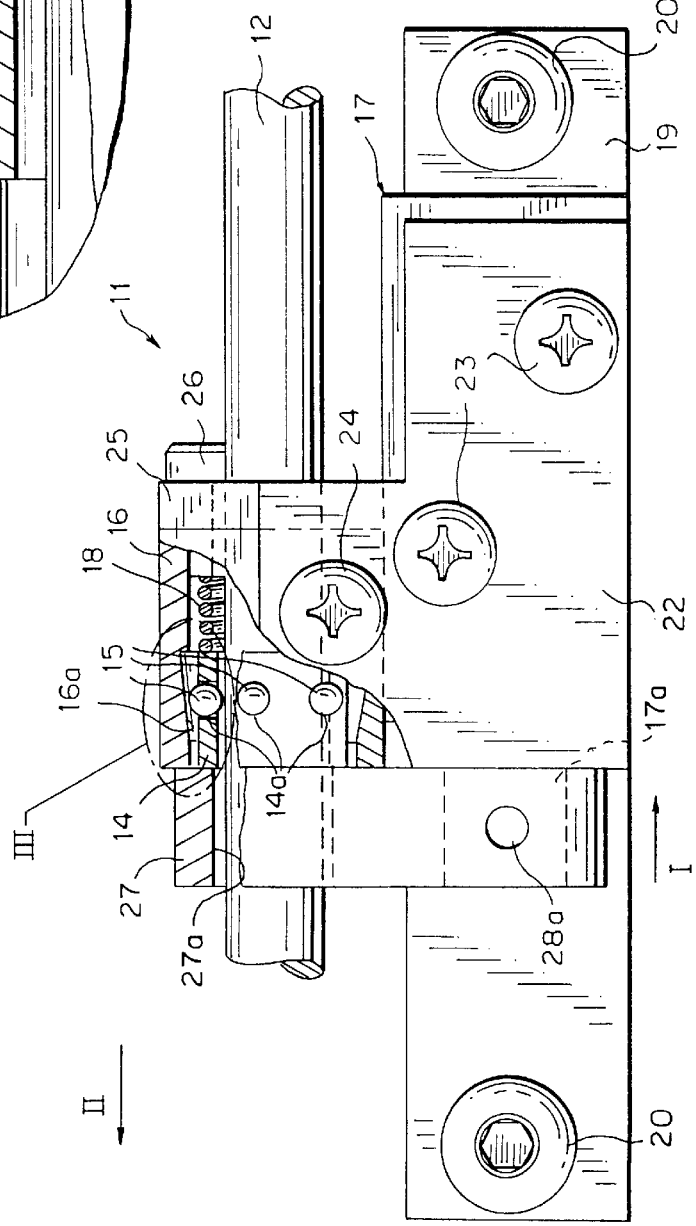
FIG. 6
FIG. 5

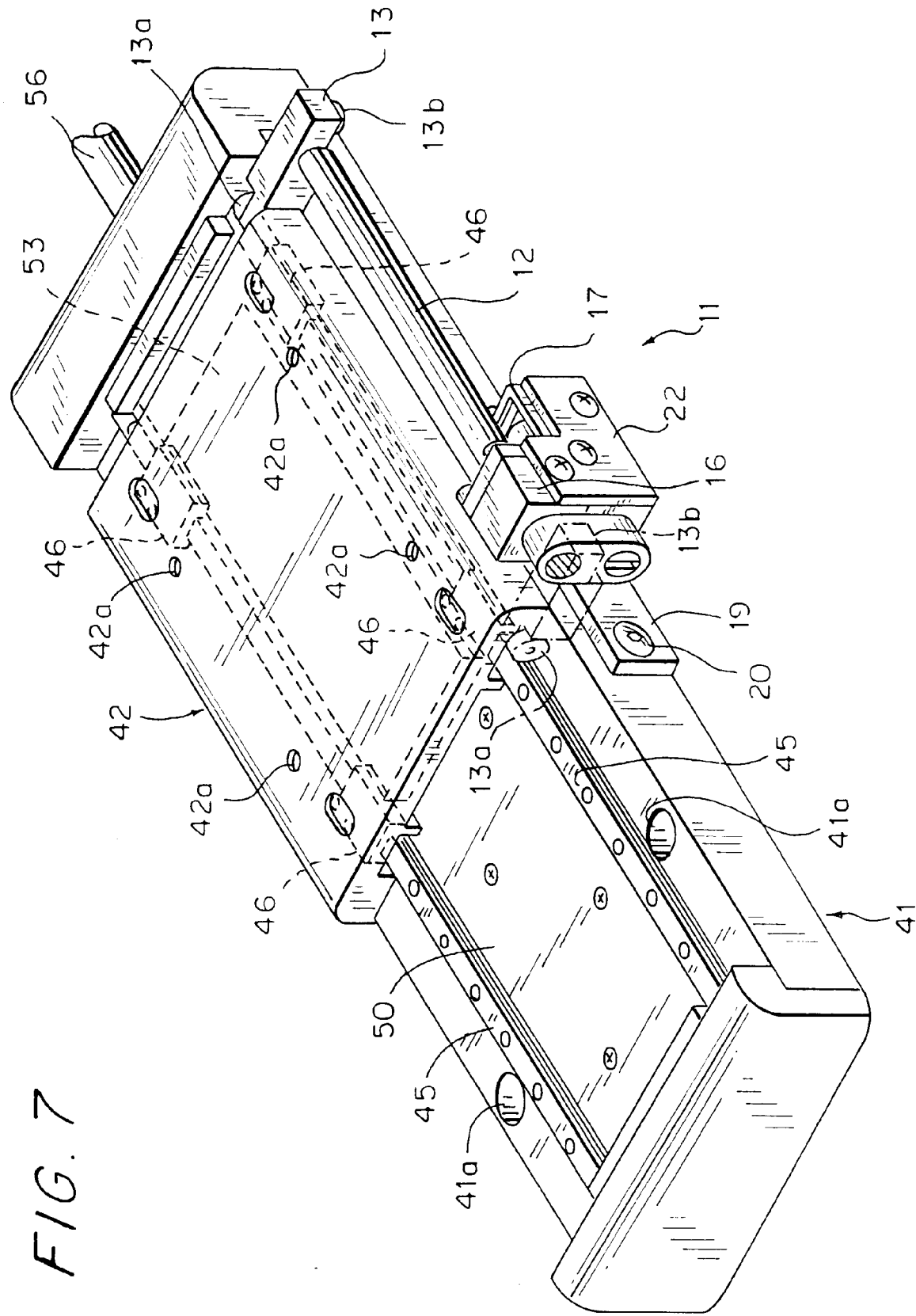

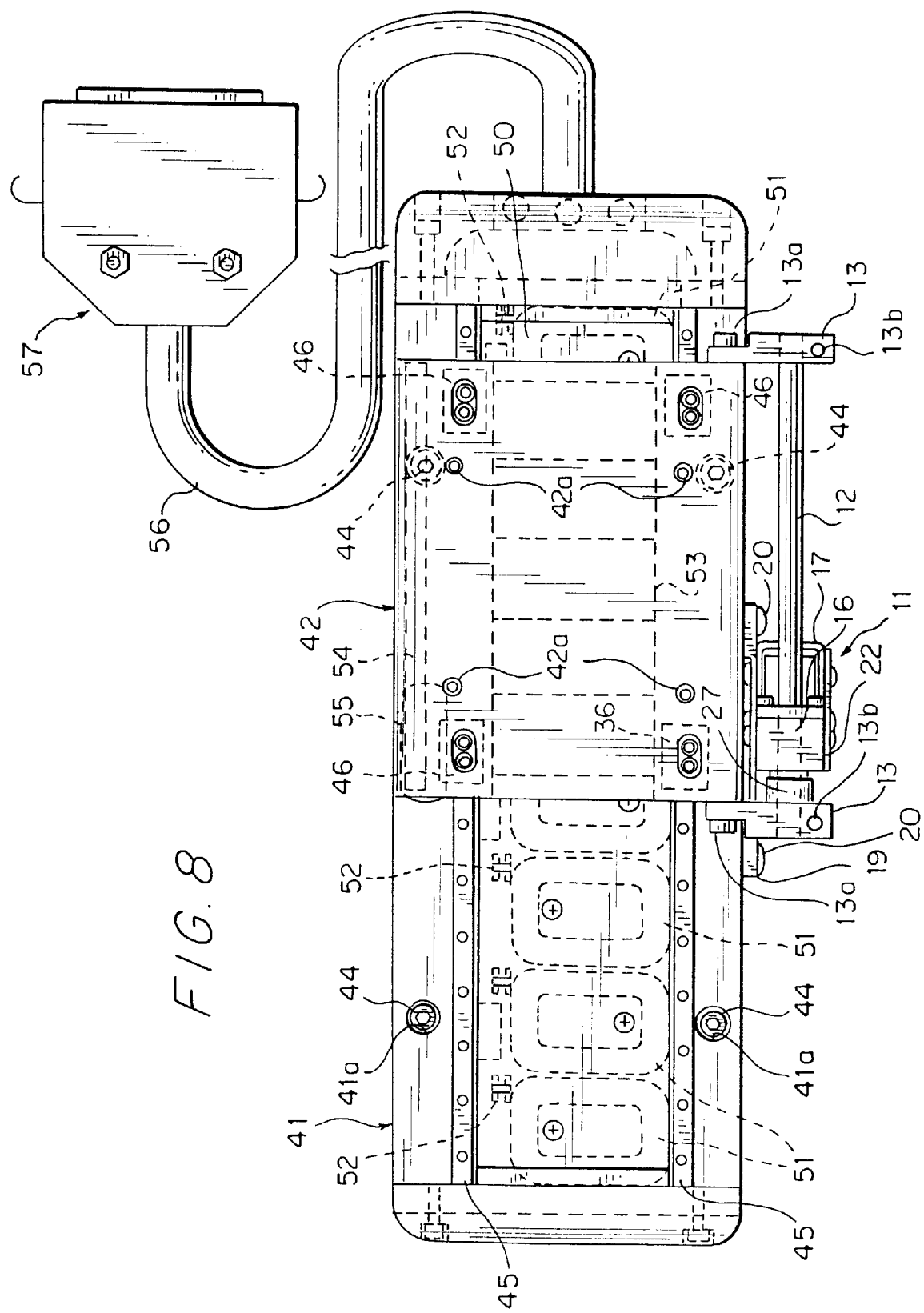

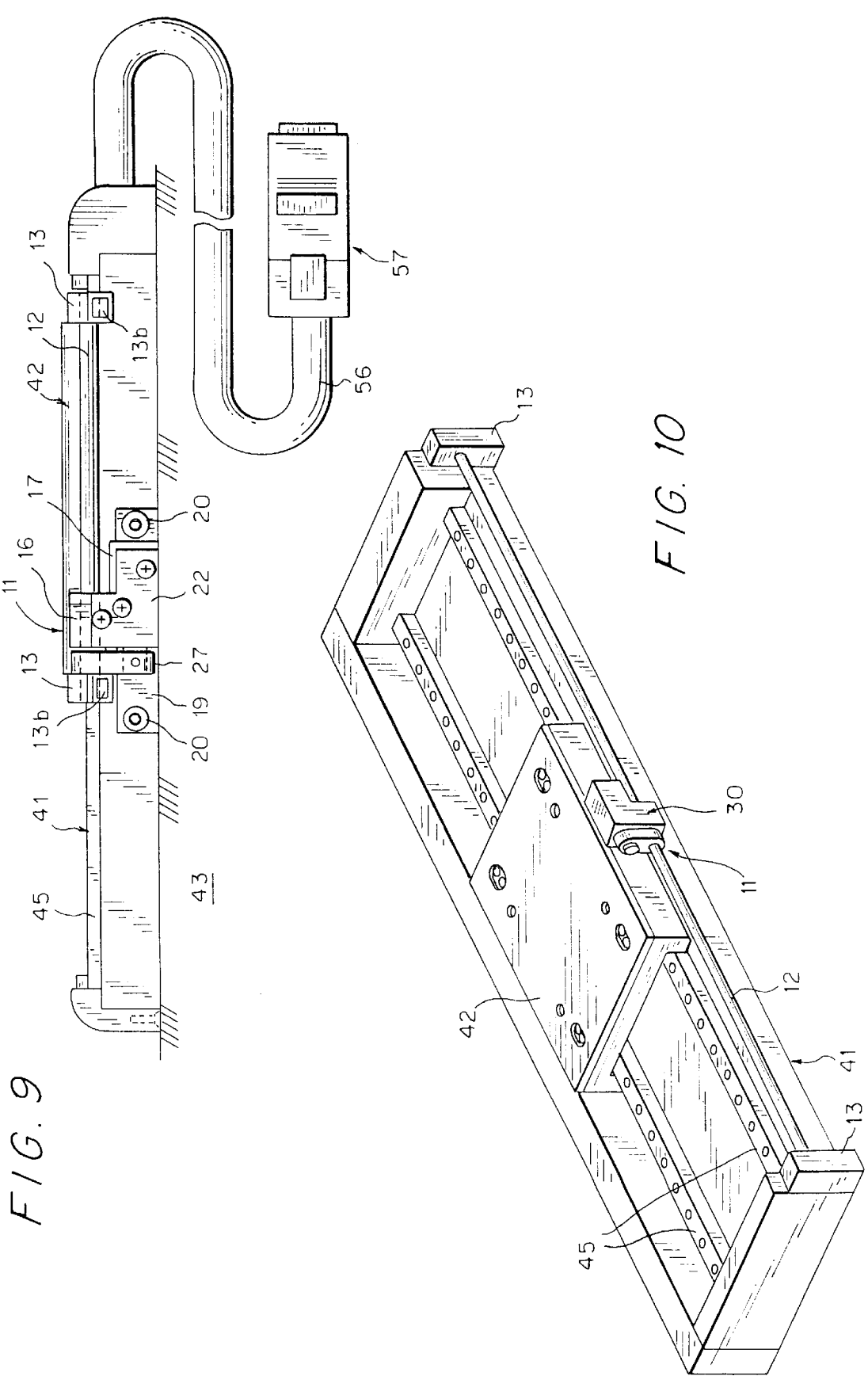

BRAKING DEVICE OF A LINEAR MOTOR TABLE

BACKGROUND OF THE INVENTION

1. Field of the Invention

The present invention relates to a braking device of a uniaxial positioning table apparatus mounted on a machine tool, an industrial robot or the like so as to position and guide a object (a driven object) with a high-accuracy, and especially, of a linear motor positioning table apparatus having a linear electromagnetic actuator as a driving source (hereafter, referred to simply as a linear motor table).

2. Description of the Prior Art

In FIG. 1, a linear motor table of the prior art is shown.

As shown in FIG. 1, the linear motor table has a long rectangular bed 1 and a table 2 moving on the bed 1 in the longitudinal direction, and a plurality of rollers installed in the table 2 rolls along a track (not shown in the figure) formed in the longitudinal direction of the bed 1, so that the table 2 may be guided along the bed 1.

Furthermore, the detecting means for detecting the position of the table 2 relative to the bed 1 comprises a linear scale 4 provided on the overhang portion 1a, which is formed at one side portion of the bed 1, a light emitting element 5a and a light receiving element 5b attached through a bracket 2a to the side portion of the table 2 corresponding to the overhang portion 1a.

The linear motor table is composed of a linear direct current motor, which comprises a primary side composed of a plurality of armature coils 7 arranged on the bed 1 along the longitudinal direction and a secondary side composed of a field magnet (not shown in the figure) attached to the under surface of the table 2 facing the armature coils 7.

The field magnet is magnetized so that a plurality of magnetic poles N and S may be arranged by turns in the direction of movement of the table 2.

The linear motor table feeds each armature coil 7 at a prescribed timing, so that the table 2 may move in the longitudinal direction of the bed 1, and the positioning action may be performed at a desired position on the basis of the detection signal of the detecting means.

The linear motor table has a problem in that it performs stopping and positioning of the moving table 2 only by the magnetic force, so that no braking force may operate when the electrical feed is cut off because of a power failure or the like and the table 2 cannot perform stopping and positioning and may move.

Especially, there is such a problem that the table 2 may drop on an occasion when the linear motor table is used in a state of a vertical axis (the direction of operation is vertical) or in a state of an approximately vertical axis so that the electrical feed may be cut off.

SUMMARY OF THE INVENTION

The object of the present invention is to provide a braking device of a linear motor table which maintains the stopping and positioning of the table, even if the electrical feed is cut off, and has a braking force.

The braking device of a linear motor table of the present invention is a linear motor table comprising: a long rectangular-plate-like bed; a table which is guided by a linear motion rolling guide unit as a guiding means along the longitudinal direction of the bed and is freely slidable; and a linear electromagnetic actuator which drives the table to freely slide relative to the bed, wherein the linear motor table has a braking device including: a shaft which extends in the longitudinal direction and is fixed to one side of the bed or the table through a bracket; a cylindrical retainer which is freely movably inserted onto the shaft and has a pocket; a braking body which is made of a rolling element loosely inserted into the pocket and having a diameter a little larger than the thickness of the retainer; an outer cylinder which includes the retainer and has, on the inside of said outer cylinder, a tapered surface jamming the braking body by making a wedge together with the shaft and which is fixed to the other of the bed or the table corresponding to the shaft; a linear electromagnetic solenoid which has a movable member for moving the retainer by energizing in such a direction that the braking body releases the tapered surface and which is fixed to the bed or the table together with the outer cylinder; and an urging means which is provided in a clearance between the inside of the outer cylinder and the shaft and which urges the retainer in the direction opposite to the movable direction by the linear electromagnetic solenoid so that the braking body may jam on the tapered surface, and wherein the linear motor table is arranged such that when the electrical feed is cut off, the braking body is jammed between the shaft and the tapered surface of the outer cylinder so as to stop the table relative to the bed.

Furthermore, the shaft is fixed to the side surface portion of the table.

Furthermore, the movable member comprises a plunger of the linear electromagnetic solenoid parallel to the shaft and a connecting member fixed to the plunger at right angles and inserted onto the shaft so as to press one end surface of the retainer.

Furthermore, the braking body is made of a ball, and further, the urging means is made of a coil spring.

BRIEF DESCRIPTION OF THE DRAWINGS

FIG. 5 is a figure for describing the action of the braking device shown in FIG. 4;

FIG. 6 is an enlarged view of the portion III shown in FIG.

FIG. 7 is a perspective view including a partial cross section showing a first embodiment in which a braking device of the present invention is applied to a linear motor table;

FIG. 8 is a plane view of the linear motor table shown in FIG. 7;

FIG. 9 is a side view showing a state where the linear motor table shown in FIG. 7 and FIG. 8 is mounted on a work bench; and FIG. 10 is a perspective view showing a second embodiment in which a braking device of the present invention is applied to a linear motor table.

DESCRIPTION OF THE PREFERRED EMBODIMENTS

Next, by referring to drawings, embodiments of the braking device of a linear motor table according to the present invention will be described.

Figure 1:
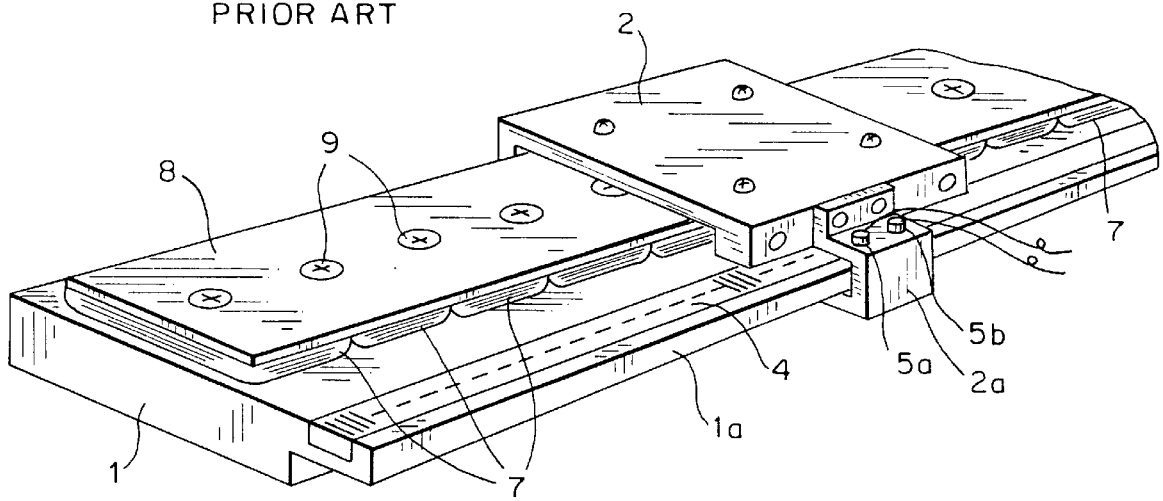
FIG. 1 is a perspective view of the principal part of a linear motor table of the prior art.
Figure 2:
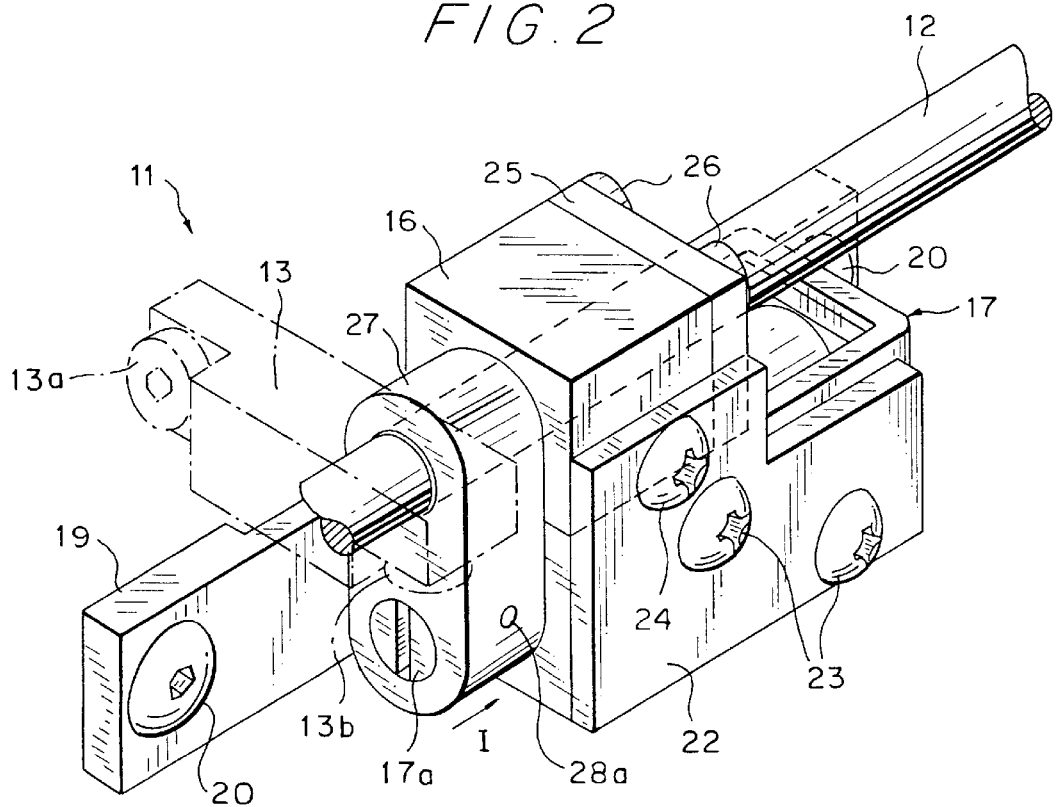
FIG. 2 is a perspective view showing the principal part of a braking device of the present invention.

FIG. 2 is a perspective view showing the principal part of a braking device of a linear motor table as a first embodiment.

Figure 3:
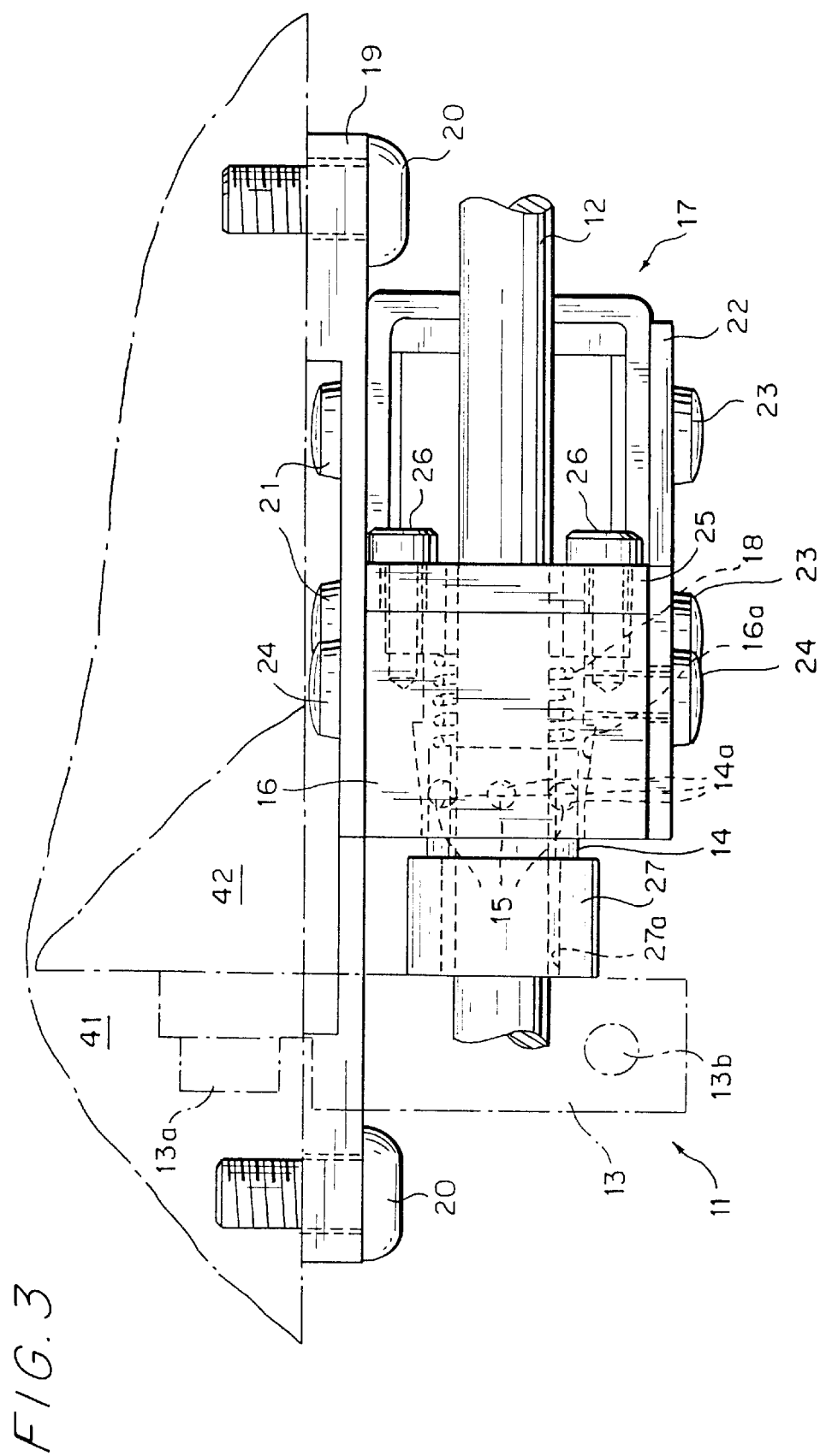
FIG. 3 is a plane view of the braking device shown in FIG. 2.

FIG. 3 is a plane view of the braking device shown in FIG. 2.

Figure 4:
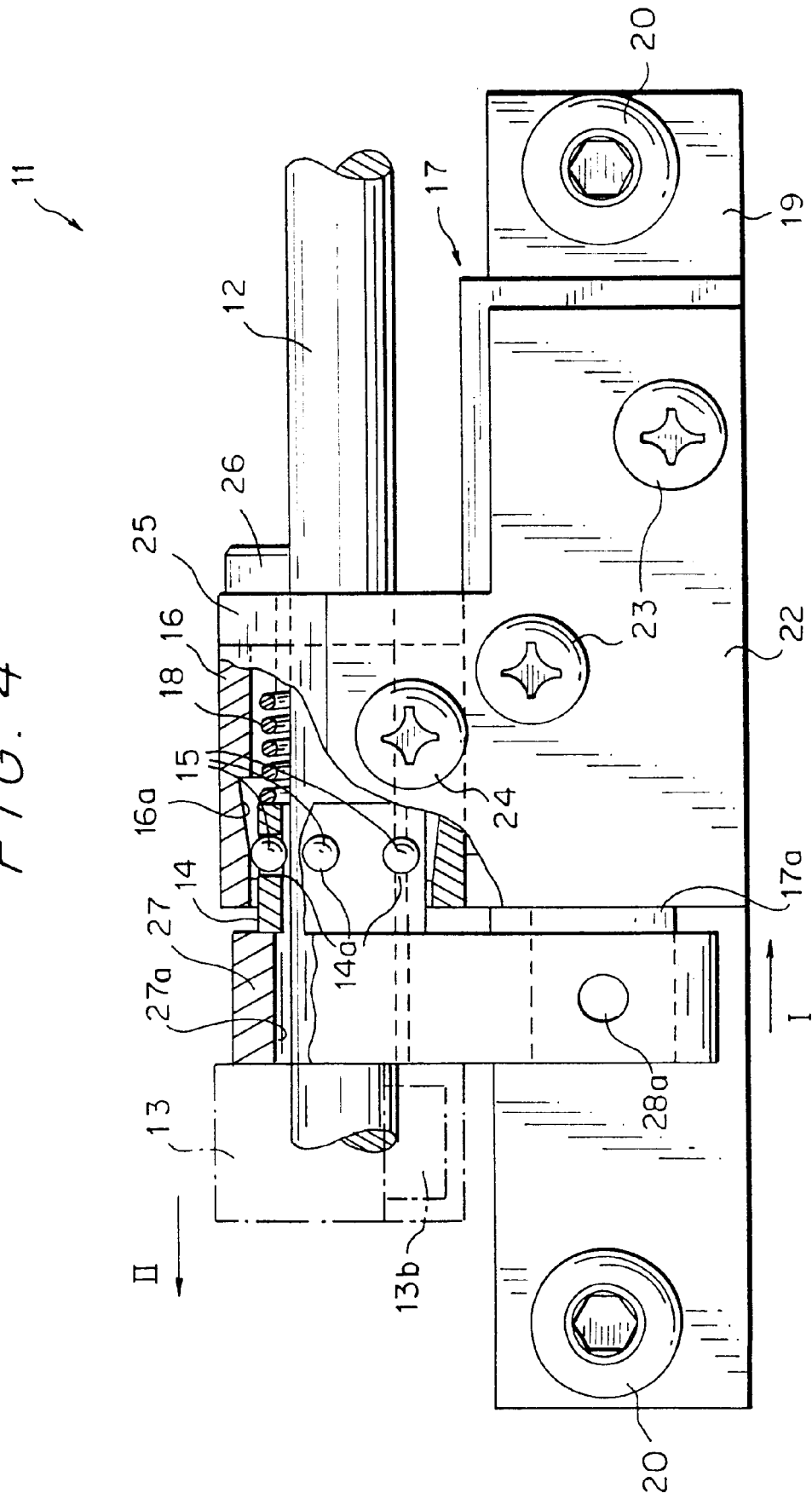
FIG. 4 is a side view including a partial cross section of the braking device shown in FIG. 2 and FIG. 3.

FIG. 4 is a side view including a partial cross section of the braking device shown in FIG. 2 and FIG. 3.

As shown in FIG. 2 to FIG. 4, the braking device 11 comprises a shaft 12, a retainer 14, balls 15, an outer cylinder 16, a linear electromagnetic solenoid 17 (hereafter, referred to simply as a solenoid), and a coil spring 18.

The retainer 14, the balls 15, the outer cylinder 16, the solenoid 17, and the coil spring 18 are called the main body of the braking device.

The shaft 12 is a thin and long column-like member, and is, as shown in FIG. 3, extended in the longitudinal direction (direction of sliding of a bed 41 on the stationary side and a table 42 on the movable side) so as to be attached and fixed.

In the following description, an embodiment in which a shaft 12 is attached and fixed to a table 42 on the movable side, is described.

The shaft 12 has the end portion inserted into holding hole of bracket 13 so as to be fastened to the bracket 13 by bolt 13b, and is installed parallel to the side surface portion of the table 42 by the bracket 13, and is fixed by fastening the bracket 13 to both end surfaces of the table 42 by bolts 13a.

The retainer 14 has a cylindrical shape and is inserted onto the shaft 12 with a clearance so as to freely move in the axial direction, and has, as shown in FIG. 3 and FIG. 4, a plurality of pockets 14a penetrating in the direction at right angles to the direction of movement.

Here, as the plurality of pockets 14a, for example, five pieces are formed spaced at equal pitch in the circumferential direction of the retainer 14.

Furthermore, in the pocket 14a of the retainer 14, balls 15 are installed, each being inserted into a pocket 14a with a little clearance, and which are a braking body having a diameter a little larger than the thickness of the retainer 14 and rolling along the shaft 12.

The outer cylinder 16 is arranged such that the inside thereof is cylindrical and is a little larger than the outside diameter of the retainer 14 so as to include the retainer 14, and a conical tapered surface 16a whose diameter gradually changes in the axial direction, is formed at the inside of the outer cylinder 16.

Moreover, the tapered surface 16a is made to be a braking surface which jams the balls 15 by holding the balls 15 like a wedge together with the shaft 12 inserted into the retainer 14.

The outer cylinder 16 has an external shape like a square pillar and is attached to the bed 41 by screws 21, 24, 20 through an attachment plate 22 and a bracket 19.

The coil spring 18 as an urging means is included in the inside of the outer cylinder 16, and is put in the clearance between the inside of the outer cylinder 16 and the shaft 12, and is located at one end of the retainer 14, and one end of the spring is engaged with a check plate 25 of the outer cylinder 16, and the other end of the spring thereof presses the end portion of the retainer 14 and urges the retainer 14 in the direction opposite to the direction of movement by the solenoid 17 so that the balls 15 may jam on the tapered surface 16a.

The solenoid 17 is fastened to the bracket 19 together with the outer cylinder 16 by screws 21 (see FIG. 3), and is fastened and fixed to the side surface of the bed 41 parallel to the shaft 12 through the bracket 19 by screws 20.

Furthermore, to the outer side surface of the solenoid 17, an approximately L shaped attachment plate 22 is fastened by screws 23, and the solenoid 17 is put between the attachment plate 22 and the bracket 19 to be fastened together with the outer cylinder 16.

The solenoid 17 comprises a plunger 17a of a moving iron core as a movable member, and an exciting coil (not shown in the figure) for moving the plunger 17a in one direction by the supply of an alternating current or a direct current. In the present embodiment, it is composed of a direct current type solenoid, and by being energized, the plunger 17a performs a sucking action (shown by the arrow I in FIG. 2 and FIG. 4).

Furthermore, at the tip of the plunger 17a, a connecting member 27 is fastened at right angles so as to move together with the plunger 17a.

The connecting member 27 is comparatively thick-walled oval-plate-shaped member long in the vertical direction, and into an upper hole 27a thereof, the shaft 12 is inserted with a clearance, and the upper end portion thereof presses the end surface of the retainer 14 to be engaged, and the bottom end portion thereof is prevented from slipping off by a check pin 28a and is inserted onto the plunger 17a.

Next, by referring to FIG. 4 to FIG. 6, the action of the braking device according to the present invention will be described.

As shown in FIG. 5 and FIG. 6, in a state where the solenoid 17 is energized, the plunger 17a of the solenoid 17 is pulled in against the urging force of the coil spring 18, and the balls 15 leave the tapered surface 16a of the outer cylinder 16 in the direction shown by the arrow I and freely rolls together with the movement of the shaft 12, so that the shaft 12 may freely move.

Here, if the electrical feed to the solenoid 17 is cut off, the attracting force of the solenoid 17 is lost, and as shown in FIG. 4, the retainer 14 is moved by the urging force of the coil spring 18 and the balls 15 are jammed on the tapered surface 16a of the outer cylinder 16 by the action of a wedge made together with the shaft 12.

Accordingly, a state where the outer cylinder 16 and the shaft 12 fix to each other, is produced, and the movement of the shaft 12 in one direction (shown by the arrow II) is restricted.

Furthermore, the movement of the shaft 12 in the other direction (direction opposite to the direction shown by the arrow II) is only a little restricted by the coil spring 18, but if a force larger than the urging force is added, the coil spring 18 is flexed and the balls 15 leave the tapered surface 16a, so that the movement may be free.

In the above mentioned arrangement, the solenoid 17 included in the braking device 11 of the present invention makes the balls 15 leave the tapered surface 16a of the outer cylinder 16 by pulling in the plunger 17a, but a solenoid which performs the same action by projecting the plunger may also be used.

Furthermore, the shaft 12 is shaped like a circular column, and corresponding to that, the retainer 14 and the outer cylinder 16 are cylindrical, but the shape of the cross section is not limited to a circle. For example, it may be a square or the like.

Furthermore, the braking body are balls 15, but it may be a column-like roller.

Furthermore, as the urging means for urging the retainer 14, a coil spring 18 is used, but, of course, a spring of another form may also be used, and a synthetic rubber with a high restoring force or the like may also be used.

Next, by referring to FIG. 7 to FIG. 9, a first embodiment of a linear motor table equipped with a braking device of the present invention will be described.

However, the sections having the structure and function equal to those of the braking device shown in FIG. 2 to FIG. 6 are omitted because the description is repeated, and only the principal parts will be described.

Furthermore, in the following drawings, to the parts having the structure and function equal to those of the braking device shown in FIG. 2 to FIG. 6, the same reference numerals are given.

FIG. 7 is a perspective view of a linear motor table equipped with the braking device 11.

FIG. 8 is a plane view of the linear motor table shown in FIG. 7.

FIG. 9 is a side view showing a state where the linear motor table shown in FIG. 7 and FIG. 8 is installed on a work bench.

As shown in FIG. 7 to FIG. 9, the linear motor table comprises: a long and rectangular-plate-like bed 41 mainly on the stationary side; a table 42 on the movable side which is guided by a linear motion rolling guide unit along the longitudinal direction of the bed 41 so as to freely slide; a linear electromagnetic actuator which drives the bed 41 and the table 42 to freely slide and to be positioned; and a braking device 11.

As shown in FIG. 7–9, the bed 41 is fastened on a work bench 43 of a machine tool or the like by bolts 44 using a plurality of bolt inserting holes 41a formed along the longitudinal direction on both sides of the bed 41.

Furthermore, the table 42 is used by fixing a driven object, for example, a work piece to be processed to screw holes 42a formed on the upper surface side.

The guide means for guiding the table 42 relative to the bed 41 is a linear motion rolling guide unit, which is arranged in such a way that on the upper surface of the bed 41, two track rails 45 with raceway grooves are installed in parallel on both sides, and to each track rail 45, two pieces of slide units 46 having raceway grooves corresponding to the raceway grooves of the track rail 45 are laid across the raceway grooves through endlessly circulating rolling elements, and the slide units 46 are installed in hollow portions at the four corners on the under surface side of the table 42.

By the guide means, the table 42 is smoothly guided.

Next, the linear electromagnetic actuator which drives the table 42 to slide and to be positioned relative to the bed 41, will be described.

In the present embodiment, the linear electromagnetic actuator is composed of a movable magnet type linear direct current motor.

In addition, various types of actuators such as a movable coil type linear direct current motor or a linear pulse motor, or a voice coil motor may also be used.

The primary side as the electrical feed side of the movable magnet type linear direct current motor includes a coil substrate 50 shown in FIG. 7 and FIG. 8, and a plurality, for example eight, armature coils 51 arranged in a hollow on bed 41 in the direction of movement of the table 42 and glued on the under surface side of the coil substrate 50.

The coil substrate 50 and the armature coils 51 are installed in the hollow portions formed through the whole length in the longitudinal direction on the upper surface side of the bed 41.

Furthermore, to the under surface of the coil substrate 50, Hall-effect elements 52 are installed respectively corresponding to the armature coils 51, and the Hall-effect elements 52 output electric information complying with the quantity of the magnetic lines of force emitted by the field magnet 53 engaged on table 42, and on the basis of the electric information, the electrical feed and its cut off to the armature coils 51 are performed by the control of an external control circuit (not shown in the figure).

Meanwhile, the secondary side of the linear direct current motor is arranged such that a field magnet 53 is attached to the under side of the table 42 as shown in FIG. 8.

The field magnet 53 is shaped like a rectangular plate, and is magnetized such that a plurality of magnetic poles N, S (in this case, five poles) are arranged by turns along the direction of reciprocation of the table 42.

Accordingly, by the arrangements of the primary side and the secondary side, a thrust based on Fleming's left-hand rule is produced and the table 42 on the movable side is moved.

Furthermore, as shown in FIG. 8, as a detecting means for detecting the relative position of the table 42 to the bed 41 and for discriminating the direction of the movement, a linear scale 54 is located at the under surface of the table 42 and a sensor 55 is installed on the upper surface of the bed 41 in opposition to the linear scale.

The linear scale 54 is composed of a magnetic scale, wherein a plurality of magnetic poles N, S are magnetized by turns at a fine pitch in the longitudinal direction of the table 42, and at one end, a magnetic pole for the signal of origin is magnetized.

Then, on the basis of the signal from the detecting means, the present position of the table 42 is detected at all times, and by using the linear direct current motor, the table 42 can be moved to an arbitrary position and be positioned.

Furthermore, the taking-out of the signals from the Hall-effect element 52 and the sensor 55, the electrical feed to the armature coil 51, and the like, are performed through a cable 56 and a socket 57 shown in FIG. 7 to FIG. 9.

Moreover, the electrical feed to the solenoid 17 is also performed through the cable 56 and the socket 57.

Next, the action of the linear motor table will be described.

When an operator operates a control switch or the like and an operating command is issued from the control section, the table 42 stopped at an arbitrary position moves toward the reference position on one end side of the operation stroke, that is, on the right end side in FIG. 7 to FIG. 9.

When the table 42 reaches the reference position, the scale positioning data are reset by the signal of the reference position from the sensor 55.

Next, the table 42 moves to a prescribed position according to a prescribed program. The control of the position and the direction of the movement of the table 42 is performed on the basis of the signals from the linear scale 54 and the sensor 55.

In a case where the linear motor table performs the above action, that is, in a case where the electrical feed is performed, as shown in FIG. 5 and FIG. 6, the solenoid 17 is also energized and the plunger 17a of the solenoid 17 is pulled in against the urging force of the coil spring 18 so as to make the balls 15 leave the tapered surface 16a of the outer cylinder 16 in the direction shown by the arrow I , so that the movement of the shaft 12 may be free and the movement of the table 42 may also be freely performed.

Then, when the electrical feed to the linear motor table is cut off, for example, by a power failure or the like, the thrust and the braking force of the linear direct current motor and the suction of the solenoid 17 are lost, and as shown in FIG. 4, the retainer 14 is moved by the urging force of the coil spring 18 and the balls 15 are jammed on the tapered surface 16a of the outer cylinder 16 acting as a wedge together with the shaft 12, so that the movement of the shaft 12 and the movement of the table 42 may be restricted in a fixed state in one direction (shown by the arrow II) and may be stopped.

When the energizing is started after returning from the state of a power failure, the plunger 17a of the solenoid 17 is pulled in again, and as mentioned above, the balls 15 leave the tapered surface 16a of the outer cylinder 16 and the jamming is released, so that the fixed state of the table 42 may also be released and the action of the table 42 by the linear direct current motor may be free.

When the energizing is restarted, it is possible to read out the data in the memory of the control circuit and to perform the repositioning from the stopped position, so that the moving distance of the table 42 may become short, which is effective.

Thus, the linear motor table is effective in that when the electrical feed is cut off because of a power failure or the like, the table 42 is sure to be in a fixed state in one direction and be stopped, so that in a case where it is used in a state of the vertical axis or the nearly vertical axis, the movable portions such as the table 42 may not move, that is, may not drop.

Furthermore, the linear motor table is arranged such that the shaft 12 of the braking device 11 is installed to the table 42 as the movable side, and the main body of the braking device including the solenoid 17 is attached to the bed 41 as the stationary side, and the shaft 12 is lightweight when compared with the main body of the braking device, so that the load of the movable portion composed of the table 42 and the like may be decreased, and a high speed driving and a highly accurate positioning may be performed.

Furthermore, the linear motor table is arranged such that the shaft 12 is provided at the side surface portion of the table 42, so that an empty space may be secured on the upper surface of the table 42 and the loads to be mounted may be mounted without being obstructed.

Furthermore, the linear motor table is arranged such that the main body of the braking device is fixed to the side surface portion of the bed 41 together with the shaft, so that the main body of the braking device may not obstruct the running of the table 42.

Next, by referring to FIG. 10, a second embodiment in which the braking device according to the present invention is applied to a linear motor table, will be described.

FIG. 10 is a perspective view showing the second embodiment.

The second embodiment is different from the first embodiment only in that while the above mentioned first embodiment is arranged such that the shaft 12 of the braking device 11 is attached to the table 42 as the movable side and the main body 30 of the braking device composed of the solenoid 17 and the like is attached to the bed 41, the second embodiment is arranged such that the shaft 12 is installed to the bed 41 as the stationary side and the main body 30 of the braking device is installed to the table 42. The action is the same.

In the second embodiment in which the shaft 12 is attached on the bed 41 side, the length of the shaft 12 extends through the whole length of the bed 41, so that the operating stroke of the table 42 may be made larger if necessary.

Furthermore, in each of the above embodiments, the table 42 is sure to be in a fixed state in one direction and be stopped. In a case where the stopping in both directions is performed, the stopping can easily be performed by installing a plurality of main bodies 30 of the braking devices facing to each other to one shaft 12, or by forming a plurality of opposite tapered surfaces 16a inside the outer cylinder 16.

As described above, according to the present invention, the table is sure to be in a fixed state and be stopped when the electrical feed is cut off because of a power failure or the like.

Furthermore, even if the linear motor table is used in a state of a vertical axis or a nearly vertical axis, the movable portion such as the table does not drop.

What is claimed is:

1. A braking device of a linear motor table, in a linear motor table comprising a long rectangular-plate-like bed, a table which is guided by a linear motion rolling guide unit as a guiding means along a longitudinal direction of said bed and is freely slidable, and a linear electromagnetic actuator for driving said table to freely slide relative to the bed, wherein the braking device comprises:

a shaft extending in said longitudinal direction and fixed parallel to one edge of said bed or table through a bracket;

said shaft inserted through a cylindrical retainer which is freely movable along said shaft;

said cylindrical retainer having at least one pocket located between ends thereof;

a braking body comprising rolling element loosely inserted into said pocket;

said rolling element having a diameter slightly larger than a thickness of said retainer;

an outer cylinder encompassing said cylindrical retainer;

said outer cylinder having a tapered surface on an inside thereof which forms a wedge together with said shaft on which wedge said braking body is selectively engaged;

said outer cylinder being fixed to the other of said bed or said table corresponding to said shaft;

a linear electromagnetic solenoid being fixed to said bed or said table together with said outer cylinder;

said linear electromagnetic solenoid having a movable cylindrical member with an axis parallel to said shaft and spaced apart from an axis of said retainer;

said moveable cylindrical member moving said retainer in a first direction through a connector wherein said braking body is disengaged from said wedge;

and urging means provided in a clearance between the inside of said outer cylinder and said shaft and spaced apart from said solenoid;

said urging means urging said retainer in a second direction opposite to said first direction wherein said braking body is engaged on said wedge;

wherein the linear motor table is arranged such that when the electrical feed is cut off, said braking body is engaged on said wedge so as to stop said table relative to said bed.

2. A braking device of a linear motor table described in claim 1, wherein said shaft is fixed to a side surface portion of said table.

3. A braking device of a linear motor table described in claim 1, wherein said movable member comprises a plunger of said linear electromagnetic solenoid parallel to said shaft and a connecting member fixed to said plunger at right angles and inserted onto said shaft so as to press one end surface of said retainer.

4. A braking device of a linear motor table described in claim 1, wherein said braking body is made of a ball, and further, said urging means is made of a coil spring.

5. A braking device of a linear motor table described in claim 1, wherein said cylindrical retainer has a plurality of pockets located between ends thereof.

6. A braking device of a linear motor table, in a linear motor table comprising a long rectangular-plate-like bed, a table which is guided by a linear motion rolling guide unit as a guiding means along a longitudinal direction of said bed and is freely slidable, and a linear electromagnetic actuator for driving said table to freely slide relative to the bed, wherein the braking device comprises:

a shaft extending in said longitudinal direction and fixed parallel to one edge of said bed or table through a bracket;

said shaft inserted through a cylindrical retainer which is freely movable along said shaft;

said cylindrical retainer having at least one pocket located between ends thereof;

a braking body having a rolling element loosely inserted into said pocket;

said rolling element having a diameter slightly larger than a thickness of said retainer;

an outer cylinder encompassing said cylindrical retainer;

said outer cylinder having a tapered surface on an inside which forms a wedge together with said shaft on which wedge said braking body is selectively engaged;

said outer cylinder being fixed to the other of said bed or said table corresponding to said shaft;

a linear electromagnetic solenoid being fixed to said bed or said table together with said outer cylinder;

said linear electromagnetic solenoid having a movable member with an axis parallel to said shaft for moving said retainer in a first direction wherein said braking body is disengaged from said wedge;

and urging means provided in a clearance between the inside of said outer cylinder and said shaft and spaced apart from said solenoid;

said urging means urging said retainer in a second direction opposite to said first direction wherein said braking body is engaged on said wedge;

wherein the linear motor table is arranged such that when the electrical feed is cut off, said braking body is engaged on said wedge so as to stop said table relative to said bed; and wherein said movable member includes a plunger of said linear electromagnetic solenoid parallel to said shaft and a connecting member fixed to said plunger at right angles and inserted onto said shaft so as to press one end surface of said retainer.

7. A braking device of a linear motor table described in claim 6, wherein said shaft is fixed to a side surface portion of said table.

8. A braking device of a linear motor table described in claim 6, wherein said braking body is a ball, and, said urging means is a coil spring.

9. A braking device of a linear motor table described in claim 6, wherein said cylindrical retainer has a plurality of pockets located between ends thereof.

* * * * *